(12) United States Patent
Bohli et al.

(10) Patent No.: US 9,955,346 B2
(45) Date of Patent: Apr. 24, 2018

(54) PRESERVING PRIVACY BY CONCEALING LOCATION INFORMATION WITH A PSEUDO-RANDOM PERMUTATION PROCESS

(71) Applicant: NEC EUROPE LTD., Heidelberg (DE)

(72) Inventors: Jens-Matthias Bohli, Leimen (DE); Ghassan Karame, Heidelberg (DE); Wenting Li, Heidelberg (DE); Dan Dobre, Munich (DE)

(73) Assignee: NEC CORPORATION, Tokyo (JP)

( * ) Notice: Subject to any disclaimer, the term of this patent is extended or adjusted under 35 U.S.C. 154(b) by 37 days.

(21) Appl. No.: 15/101,491

(22) PCT Filed: Dec. 5, 2013

(86) PCT No.: PCT/EP2013/075617
§ 371 (c)(1),
(2) Date: Jun. 3, 2016

(87) PCT Pub. No.: WO2015/082003
PCT Pub. Date: Jun. 11, 2015

(65) Prior Publication Data
US 2016/0309322 A1 Oct. 20, 2016

(51) Int. Cl.
*H04W 4/02* (2018.01)
*H04W 12/02* (2009.01)
*G06F 21/60* (2013.01)

(52) U.S. Cl.
CPC .......... *H04W 12/02* (2013.01); *G06F 21/602* (2013.01); *H04W 4/021* (2013.01)

(58) Field of Classification Search
CPC .............................. G06F 21/602; H04W 4/021
USPC ........................................................... 726/26
See application file for complete search history.

(56) References Cited

U.S. PATENT DOCUMENTS

| 2008/0176583 | A1* | 7/2008 | Brachet | G01S 5/0236 455/456.3 |
| 2009/0030778 | A1* | 1/2009 | Zapata | G06F 21/6254 705/7.34 |
| 2010/0169400 | A1* | 7/2010 | Yang | G06F 7/76 708/250 |
| 2010/0272043 | A1* | 10/2010 | Cho | H04L 5/0007 370/329 |

(Continued)

OTHER PUBLICATIONS

Sharad Jaiswal et al: "Trust No One: A Decentralized Matching Service for Privacy in Location Based Services", Proceedings of the Second ACM SGCOMM Workshop on Networks, Systems, and Applications on Mobile Handhelds, Mobiheld '10, Aug. 30, 2010 (Aug. 30, 2010), p. 51, XP055141987, p. 51-56.

*Primary Examiner* — Haresh N Patel
(74) *Attorney, Agent, or Firm* — Leydig, Voit & Mayer, Ltd.

(57) ABSTRACT

A method for preserving privacy within a communication system, wherein a location-based service concerning an area of interest is provided for at least one user by a database server and wherein location information represented by coordinates of objects and/or users and/or areas and/or queries, made to the location-based service, is concealed, includes concealing the location information by transforming coordinates by first splitting the area of interest up in tiles for providing at least one tiling of the area of interest, and then permuting the tiles by a pseudo-random permutation process.

13 Claims, 3 Drawing Sheets

(56) References Cited

U.S. PATENT DOCUMENTS

| | | | |
|---|---|---|---|
| 2011/0098072 A1* | 4/2011 | Kim | H04L 5/0032 455/509 |
| 2011/0176501 A1* | 7/2011 | Jeong | H04L 5/0023 370/329 |
| 2012/0203663 A1 | 8/2012 | Sinclair et al. | |
| 2012/0291108 A1* | 11/2012 | Talamo | H04L 9/3273 726/6 |
| 2012/0294247 A1* | 11/2012 | Choi | H04L 5/0069 370/329 |
| 2013/0067412 A1* | 3/2013 | Leonard | G06F 3/0482 715/835 |
| 2013/0286044 A1* | 10/2013 | Puckett | G06T 11/00 345/619 |
| 2014/0059695 A1* | 2/2014 | Parecki | G06F 21/60 726/26 |
| 2014/0095860 A1* | 4/2014 | Shikfa | H04L 9/008 713/150 |
| 2016/0309322 A1* | 10/2016 | Bohli | H04W 12/02 713/150 |

* cited by examiner

PRESERVING PRIVACY BY CONCEALING LOCATION INFORMATION WITH A PSEUDO-RANDOM PERMUTATION PROCESS

CROSS REFERENCE TO RELATED APPLICATIONS

This application is a U.S. National Stage Application under 35 U.S.C. § 371 of International Application No. PCT/EP2013/075617, filed on Dec. 5, 2013. The International Application was published in English on Jun. 11, 2015 as WO 2015/082003 A1 under PCT Article 21(2).

FIELD

The present invention relates to a method for preserving privacy within a communication system, wherein a location-based service concerning an area of interest is provided for at least one user by a database server and wherein location information represented by coordinates of objects and/or users and/or areas and/or queries, made to the location-based service, is concealed. Further, the present invention relates to a communication system, comprising a database server for providing a location-based service concerning an area of interest for at least one user, wherein location information represented by coordinates of objects and/or users and/or areas and/or queries, made to the location-based service, is concealed.

BACKGROUND

Location-based services are becoming increasingly popular. However, using a public cloud for offering location-based services exposes valuable information. The cloud provider that offers the service is able to track objects, users, and queries made to the service. A company using the service exposes e.g. the location, movements, and areas of interest of assets and employees, which can be undesirable. In fact, many companies are hesitant about using such cloud services because they fear leakage of their critical location data, potentially to unauthorized/untrusted parties. Hence, concealing location information from untrusted parties is critical for wider-spread adoption of cloud-based location services.

An example for a location-based service is geo-fencing, where events are triggered when people or devices enter or leave a defined area. To conceal the location information while still using public-cloud-based location services requires a transformation of the location information in a way that the output can still be processed by the location-based service. State-of-the-Art includes order preserving encryption (OPE), which however can only provide a weak level of concealment, See R. Agrawal, J. Kiernan, R. Srikant, and Y. Xu "Order-Preserving Encryption for Numeric Data" in SIGMOD, 2004, because it preserves the relative location between points. Another option is adding noise to the data, which again offers only weak concealment but also reduces the quality of the service. Current approaches can only provide k-anonymity by clustering all nearby nodes in order to hide their actual identity, basically by adding noise to the spacial location and time of request, See B. Gedik and L. Liu "Location Privacy in Mobile Systems: A Personalized Anonymization Model" in ICDCS, 2005, M. Gruteser and D. Grunwald "Anonymous Usage of Location-Based Services Through Spatial and Temporal Cloaking" in USENIX MobiSys, 2003, P. Kalnis, G. Ghinita, K. Mouratidis, and D. Papadias "Preventing Location-Based Identity Inference in Anonymous Spatial Queries", IEEE TKDE, 19(12):1719-1733, 2007, and M. F. Mokbel, C.-Y. Chow, and W. G. Aref "The New Casper: Query Processing for Location Services without Compromising Privacy" in VLDB, 2006.

SUMMARY

In an embodiment, the present invention provides a method for preserving privacy within a communication system, wherein a location-based service concerning an area of interest is provided for at least one user by a database server and wherein location information represented by coordinates of objects and/or users and/or areas and/or queries, made to the location-based service, is concealed, comprises concealing the location information by transforming coordinates by first splitting the area of interest up in tiles for providing at least one tiling of the area of interest, and then permuting the tiles by a pseudo-random permutation process.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
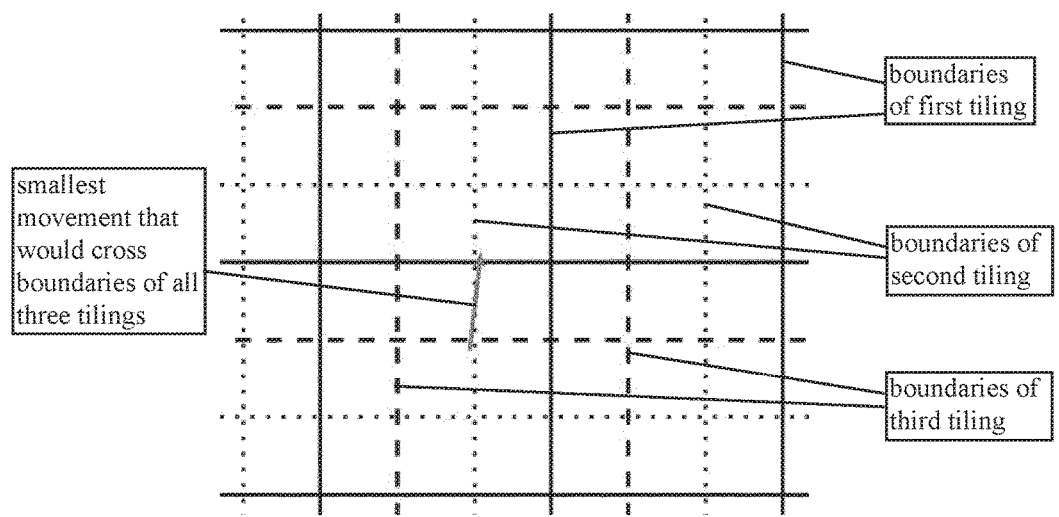
FIG. 1 depicts an example of three tilings of an area according to an embodiment of the invention.

An embodiment of the present invention provides a method for preserving privacy within a communication system and provides an according communication system for allowing an efficient and reliable concealment of location information.

An embodiment of the present invention provides a method for concealing the location information by transforming the coordinates by first splitting the area up into tiles for providing at least one tiling of said area and then permuting the tiles by a pseudo-random permutation process.

An embodiment of the present invention provides a communication system for concealing location information by transforming coordinates that includes means for first splitting up an area in tiles for providing at least one tiling of said area and means for then permuting the tiles by a pseudo-random permutation process.

An embodiment of the invention provides for concealing the location information by transforming the coordinates in which the area of interest is first split up in tiles for providing at least one tiling of said area. Then, the tiles are permuted by a pseudo-random permutation process. This provides the basis for a very efficient and reliable concealment of location information.

An embodiment of the invention makes it possible to allow for a very efficient and reliable concealment of location information by simply combining a pseudo-random permutation process and an order-preserving encryption process. After the pseudo-random permutation process said area is encrypted by an order-preserving encryption process. This preferred method provides first an encryption of location information or location data on a coarse granular level by the pseudo-random permutation process and then on a fine granular level by the order-preserving encryption process. The direction of the movement of an object, user or query is hidden by the coarse granular process. According distances of movements are hidden by the fine granular encryption. Thus, on the basis of the preferred combination of the coarse granular and fine granular encryption a very efficient and reliable concealment of location information is possible. This preferred solution is efficient and non-intrusive as it does not require any changes to existing geo-spatial algorithms used in location-based services or stores. An according communication system can comprise means for encrypting said area by an order-preserving encryption process after the pseudo-random permutation process.

Within a further preferred embodiment of the invention, three different tilings can be created. On the basis of such three different tilings of an area of interest or of a map the semantic of cross-tile movements can be maintained and linking of movements across tiles can be prevented.

A concrete and very simple pseudo-random permutation process can comprise a rotation and/or flipping and/or shuffling of the tiles. Thus, a very effective obfuscation of the direction of movements can be provided.

Within a preferred embodiment each tile can be individually rotated and/or flipped. Thus, a very effective and reliable obfuscation of the direction of movements of objects and/or users can be realized.

Within a preferred concrete embodiment a location privacy layer can be used for a translation or transformation of the location information or coordinates. Such a location privacy layer can be a connection or mediation tool between objects and/or users on one side and the database server on the other side. Concretely, the location privacy layer can mediate the exchange of information between the objects and/or users on one side and the database server on the other side. Thus, the location privacy layer can translate both the object and the user input and can store and/or process only the transformed inputs in the database server.

Within a method according to an embodiment, multiple tilings of an area of interest can be used so that a tiling can be chosen where a movement of an object and/or user does not cross a boundary of a tile in the respective tiling. Within a preferred embodiment of the method the location privacy layer can judge and relay a location information input from an object and/or user to a tiling in which a movement of an object or user does not cross a boundary of a tile. Thus, crossing of a boundary by a movement can be avoided or compensated.

For providing a very effective concealment of location information the order-preserving encryption process can be applied to all tilings separately. For achieving high robustness and load balancing abilities the tilings can each be stored at different servers. Thus, for each tiling an individual server can be provided. Within a further preferred embodiment, the location-based service can comprise a geo-fencing application. Such applications have recently become more and more popular. Within a further preferred embodiment the location-based service can be provided by means of a cloud server. Concretely, the database server can be provided within a cloud. In order to be used as a cloud-service, a method and system according to an embodiment are designed so that no modifications are required on the database. The overhead for pre- and post-processing of the data in a proxy is small, so that the benefits of outsourcing computation to the cloud are preserved.

Within a method according to an embodiment, coordinates can be transformed so that the original location is concealed, but correct response to query operations within a range of the location is preserved. Further, minimal overhead for the database server in terms of the number of database queries and cost per operation is provided. No modifications to the existing geo-spatial algorithms and no compromise of the accuracy of the location lookup is necessary.

A method and system according to an embodiment of the invention have the advantage that locating and tracking of requests is hindered. Further, no random noise is necessary, thus responses on the encrypted data map exactly to the original data. For realizing the inventive method and system three mirrored database servers can be used for individually handling different tilings.

FIG. 1 depicts three tilings of an area of interest. The arrow shows the smallest movement that would cross boundaries on all three tiles, thus showing the upper bound for distances that can be compared to each other without having to be split up.

To construct the transformed map of an area of interest, first the map is divided by a regular grid into fixed-size tiles resulting in a tiling of said tiles. The resulting tiles are then pseudo-randomly permuted. This first step serves to distort the original map while keeping the relative locations within each tile. However, the neighborhood between points across a tile boundary is not preserved once the tiles are separated.

Thus, movement across a tile boundary is not preserved after permuting the tiles. This can be solved by using multiple maps or tilings, so that a movement that crosses a boundary in one map or tiling does not cross a boundary in another map or tiling. The location privacy layer will judge and relay the location inputs to the map or tiling in which the movement will not cross the boundary. Note, that two maps or tilings would not be enough. If two different tilings of a map are superimposed, there are intersection points of the boundaries and a movement across an intersection point would cross tile boundaries in both maps. However, a third tiling can be placed that avoids having a boundary at those intersections.

The creation of three such tilings according to FIG. 1 is preferred, in order to be able to place a movement within one tile on at least one of the tilings. The following fine-granular steps are then applied for all three tilings separately. Here, the three tilings can be stored at different servers thus achieving high robustness and load balancing abilities. Note that by requiring three different tilings, our scheme does incur the same number of operations when compared to the original setting where only one map tiling is stored.

Each tile is individually rotated, rotation chosen at random among 0, 90, 180 or 270 degree, in order to hide the direction of the movement and then individually flipped in order to obfuscate the direction of two or more consecutive movements. Both, rotational process and tile flipping result in a transformation entropy of three bits per tile.

In order to hide the distances of movements, order-preserving encryption (OPE) is applied to the distorted map. Order-preserving encryption has the property that the relative order among coordinates is preserved after encryption. By preserving order, OPE can only obfuscate the distance of the reported sensor movements or object and/or user movements. OPE cannot, nor is intended to, hide the direction of movements.

A geo-fencing system is considered in the following. Here, given an initial 2D area of interest A, different users/subscribers S express their interest in receiving events that occur within specific areas/polygons.

Figure 2:
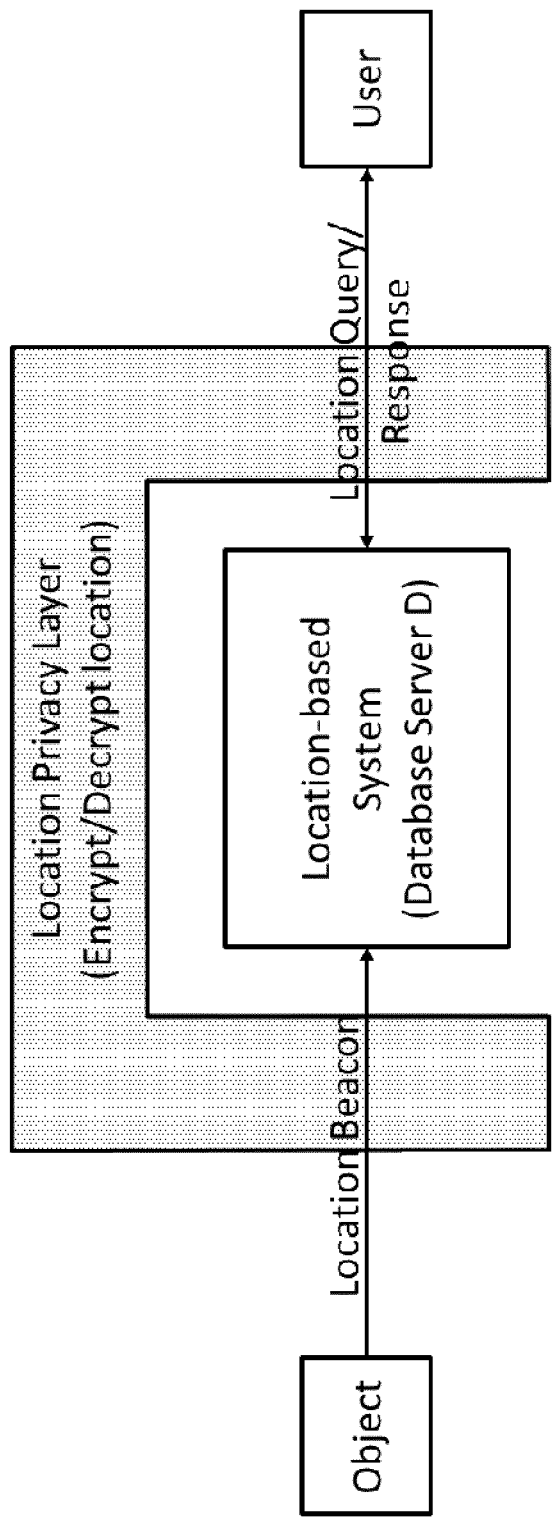
FIG. 2 illustrates a communication system according to an embodiment of the invention.

The existence of a central database server D within a system according to FIG. 2 is assumed. To subscribe to Ai, Si inserts a record in D specifying the coordinates of Ai, and a URL that D can use to communicate possible event notifications with Si. Each moving object Pj periodically sends to D location beacons. These beacons consist of triples of the form (ID, Current), where ID is an identifier of Pj and Current is a vector of the current coordinates of Pj. Additional a beacon could also contain the vector of the coordinates of the previous location of Pj in order to encode a movement.

To check the location of Pj, D relies on an efficient indexing scheme, e.g., indexing based on R trees, to efficiently output a decision. If D determines that the coordinates reported by Pj correspond to a leaving/entry event to Ai, it notifies Si accordingly. The main premise behind this embodiment is to design a privacy preserving solution for a geo-fencing application, without incurring any modifications on the database server D, and while maintaining the efficiency and scalability of the overall system. This means that D should only implement the existing functionality without any modification, but will be given transformed inputs instead of the raw inputs from the objects; at the same time, it is required that the solution does not leak any meaningful information about the location of the sensors, users, objects and subscriptions in the system to any entity, including D. The above goals are achieved by introducing a privacy-layer that mediates the exchange of information between the objects/subscribers (P, S) on one side, and D on the other side. More specifically, this layer translates both the object P and the subscriber S input and stores/processes only the transformed inputs in D. Note that, besides location information, one important advantage of the invention is to hide the fine-grained information about movements, i.e., direction and distance of movement, to prevent tracking.

One important basic operation done by the server D will be to compare two coordinates to each other that lie within a certain threshold distance. Clearly, an arbitrary encryption of the coordinates cannot preserve this functionality.

Within the above explanation the term subscriber has to be understood as synonymous term with regard to the term user. Thus, the terms user and subscriber are used in a synonymous way.

Figure 3:
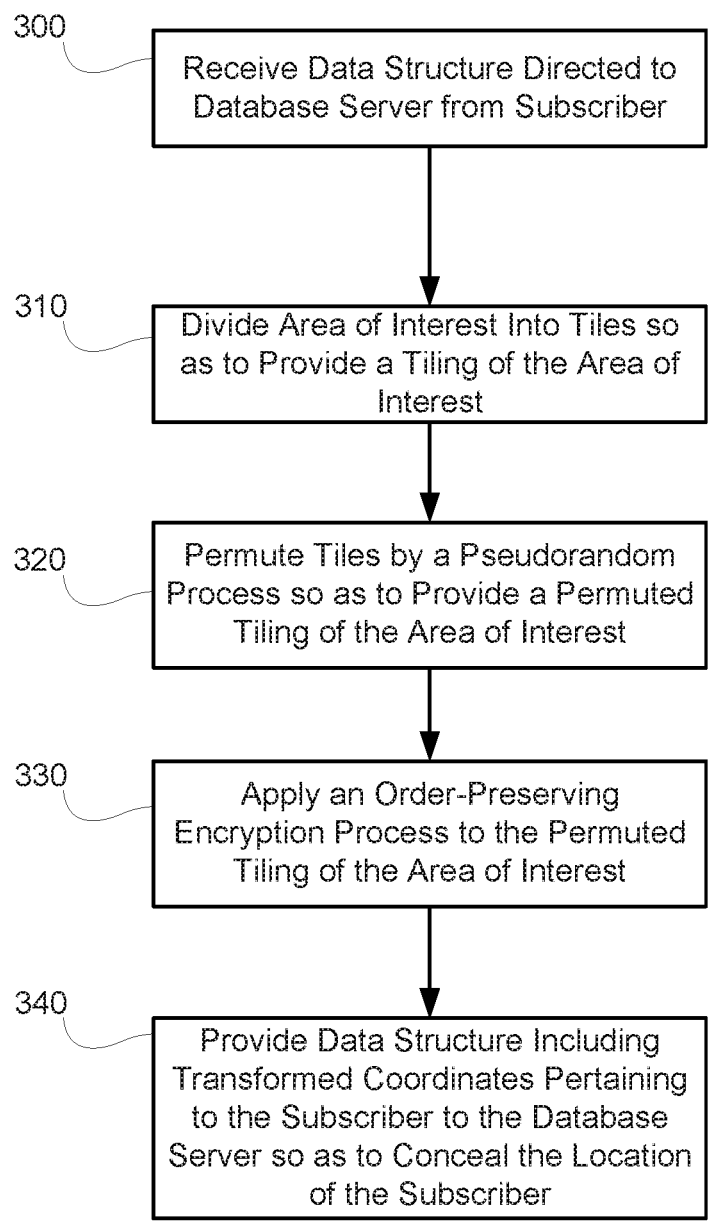
FIG. 3 is a flow diagram illustrating a method according to an embodiment of the invention.

FIG. 3 is a flow diagram illustrating a method according to an embodiment of the invention. At 300, a data structure directed to a database server is received from a subscriber. The data structure includes coordinates pertaining to location information of the subscriber, the coordinates being located within an area of interest. At 310 through 330, the coordinates are transformed. Specifically, at 310, the area of interest is divided into tiles so as to provide a tiling of the area of interest. At 320, the tiles are permuted by a pseudo-random permutation process so as to provide a permuted tiling of the area of interest. At 330, an order-preserving encryption (OPE) process is applied to the permuted tiling of the area of interest. At 340, a data structure including transformed coordinates pertaining to the subscriber is provided to the database server so as to conceal the location information of the subscriber.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for concealing location information within a communication system including a database server configured to provide location-based services, the method comprising:
   receiving, from a subscriber, a data structure directed to the database server, the data structure including coordinates pertaining to location information of the subscriber, the coordinates being located within an area of interest;
   transforming the coordinates located within the area of interest and pertaining to the subscriber by:
      dividing the area of interest into tiles so as to provide a tiling of the area of interest,
      permuting the tiles by a pseudo-random permutation process so as to provide a permuted tiling of the area of interest, and
      applying an order-preserving encryption (OPE) process to the permuted tiling of the area of interest; and
   providing, to the database server, a data structure including transformed coordinates pertaining to the subscriber so as to conceal the location information of the subscriber.

2. The method according to claim 1, wherein in dividing the area of interest into tiles so as to provide a tiling of the area of interest, three different tilings are created.

3. The method according to claim 2, wherein in permuting the tiles by a pseudo-random permutation process so as to provide a permuted tiling of the area of interest, each of the three different tilings is permuted by a pseudo-random permutation process so as to provide three different permuted tilings of the area of interest, and
   wherein in applying the order-preserving encryption (OPE) process to the permuted tiling of the area of interest, the order-preserving encryption process is applied to each of the three different permuted tilings separately.

4. The method according to one claim 2, wherein the three different tilings are each stored at different servers.

5. The method according to claim 1, wherein the pseudo-random permutation process comprises one or more of a rotation of the tiles, a flipping of the tiles, or a shuffling of the tiles.

6. The method according to claim 5, wherein the rotation of the tiles comprises rotating each tile individually.

7. The method according to claim 5, wherein the flipping of the tiles comprises flipping each tile individually.

8. The method according to claim 1, wherein a location privacy layer is used for a translation or transformation of the location information or coordinates.

9. The method according to claim 8, wherein the location privacy layer mediates the exchange of information between at least one of objects or users on one side and the database server on the other side.

10. The method according to claim 8, wherein the location privacy layer judges and relays a location information input from at least one of an object or user to a tiling in which a movement of an object or user does not cross a boundary of a tile.

11. The method according to one claim 1, wherein the location-based services comprises a geo-fencing application.

12. The method according to claim 1, wherein the location-based services are provided using a cloud server.

13. A communication system for concealing location information in location-based services, comprising:
    a database server configured to provide a location-based service; and
    a processor configured to:
        receive, from a subscriber, a data structure directed to the database server, the data structure including coordinates pertaining to location information of the subscriber, the coordinates being located within an area of interest,
        transform the coordinates located within the area of interest and pertaining to the subscriber by dividing the area of interest into tiles so as to provide a tiling of the area of interest, permute the tiles by a pseudo-random permutation process so as to provide a permuted tiling of the area of interest, and apply an order-preserving encryption (OPE) process to the permuted tiling of the area of interest, and
        provide, to the database server, a data structure including transformed coordinates pertaining to the subscriber so as to conceal the location information of the subscriber.

\* \* \* \* \*